United States Patent [19]
Birangi et al.

[11] Patent Number: 5,381,355
[45] Date of Patent: Jan. 10, 1995

[54] METHOD FOR FILTERING DIGITAL SIGNALS IN A PRESSURE TRANSMITTER

[75] Inventors: Tourang Birangi, Eastlake; Joseph C. Nemer, Mayfield Heights, both of Ohio

[73] Assignee: Elsag International N.V., Amsterdam Zuidoost, Netherlands

[21] Appl. No.: 168,946

[22] Filed: Dec. 17, 1993

[51] Int. Cl.$^6$ .................... G06F 15/31; G06J 1/00
[52] U.S. Cl. .................... 364/724.01; 364/602
[58] Field of Search .................... 364/724.01, 602

[56] References Cited
U.S. PATENT DOCUMENTS

| | | | |
|---|---|---|---|
| 5,140,543 | 8/1992 | Tanaka | 364/724.01 |
| 5,142,170 | 8/1992 | Tkacik | 364/724.01 |
| 5,150,317 | 9/1992 | Countryman | 364/724.01 |

*Primary Examiner*—Tan V. Mai
*Attorney, Agent, or Firm*—Michael M. Rickin; Paul R. Katterle

[57] ABSTRACT

A method for filtering digital signals in a pressure transmitter. The transmitter includes a microprocessor. In each operating cycle of the microprocessor included in the transmitter, the method determines if there are any noise spikes in the signal at the input to the microprocessor representative of pressure and provides rejection for such spikes. The method also provides for a faster response to a step change in pressure than is provided by conventional filtering methods and also dampens small fluctuations in the filtered output signal.

12 Claims, 1 Drawing Sheet

METHOD FOR FILTERING DIGITAL SIGNALS IN A PRESSURE TRANSMITTER

FIELD OF THE INVENTION

This invention relates to pressure transmitters and more particularly to a digital signal filtering method for use in such transmitters.

DESCRIPTION OF THE PRIOR ART

Pressure transmitters provide an analog output signal that varies from 4 to 20 milliamperes as a function of the pressure sensed by the transmitter. The pressure transmitter is designed to sense pressure over a range of predetermined pressure in engineering units such as psi. In order to sense the pressure the transmitter includes a pressure cell.

The analog output signal from the transmitter represents the sensed pressure as a percentage of the range of pressure that can be sensed by the transmitter. Therefore, when the sensed pressure is at 0% the analog output signal is at 4 milliamperes and when the sensed pressure is at 100% the analog output signal is at 20 milliamperes. The analog output signal is provided as an input to a process control loop.

Noise on the analog output signal may be caused by the pressure cell or by noise in the input hardware. The transmitter should filter any noise so that its effect is not seen on the analog output signal. Reduction in size of electronic components and increased reliability for those components have allowed microprocessors to be incorporated in pressure transmitters. However, it may not be possible to use conventional filtering methods in the microprocessor because the same may lead to a reduction in the transmitter response time required by the process control loop.

SUMMARY OF THE INVENTION

A method for filtering a digital signal during the presently occurring one of a repetitively occurring operating cycle. The digital signal is representative of an analog signal sampled during each of the operating cycles. The filtering method provides a filtered output signal at the end of each of the operating cycles.

The method comprises the steps of:

a) determining if the digital signal, N, sampled during the presently occurring operating cycle and the digital signal, O, sampled during the operating cycle just previous to the present operating cycle are both greater than or less than the filtered output signal, $F_O$, at the end of the previously occurring operating cycle;

b) determining if both N and O are greater than $F_O$, if N is greater than O or if O is greater than, or if both N and O are less than $F_O$, if N is less than O or if O is less than N; and c) calculating the filtered output signal, $F_N$, at the end of the presently occurring operating cycle as a function of $F_O$ and either:

i) O when N is greater than O and O is greater than $F_O$ or N when O is greater than N and N is greater than $F_O$; or ii) O when N is less than O and O is less than $F_O$ or N when O is less than N and N is less than $F_O$.

DESCRIPTION OF THE PREFERRED EMBODIMENT(S)

Figure 1:
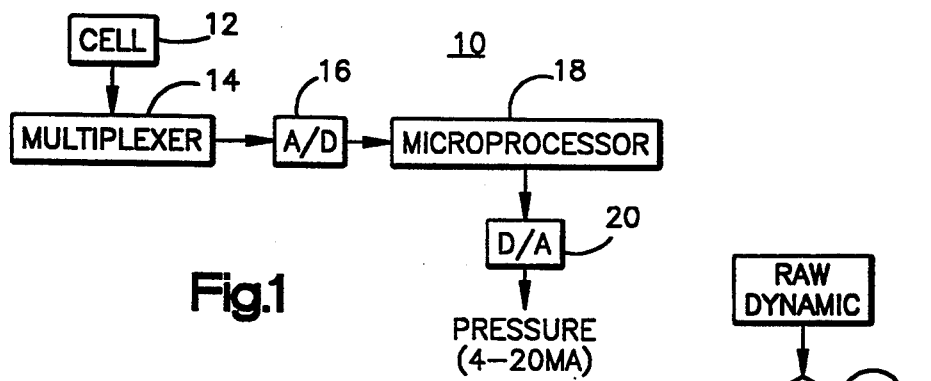
FIG. 1 shows a block diagram of that part of a transmitter which includes the method of the present invention.

Referring now to FIG. 1, there is shown a block diagram of that portion of a pressure transmitter 10 which includes the method of the present invention. Pressure transmitter 10 includes pressure cell 12 which is used to sense the pressure. The sensed pressure is provided as one of the inputs to a multiplexor 14. For ease of illustration, the other inputs to multiplexor 14 are not shown in FIG. 1.

The output of multiplexor 14, which is an analog sample of the pressure measured by cell 12, is connected to an analog to digital converter 16 whose output is connected to one input of microprocessor 18. The input to the microprocessor 18 from converter 16 is for each sample a digital signal representative of the pressure measured by cell 12. The output of the microprocessor is connected to D/A converter 20 which includes therein a low pass filter. The output of the converter 20 is the 4–20 milliampere analog signal which is representative of the pressure sensed by cell 12.

The input digital signal to the microprocessor 18 representative of the pressure measured by the cell 12 in the previous operating cycle of the microprocessor is referred to hereinafter as "O". The input digital signal to the microprocessor 18 representative of the pressure measured by the cell 12 in the present operating cycle of the microprocessor is designated as "N".

Associated with the microprocessor 18 is a read only memory (not shown) which has therein the filtering method of the present invention in the form of instructions to be executed by the microprocessor. The digital signal representative of the pressure sensed by cell 12 at the output of the microprocessor 18 is then a filtered digital signal, F, wherein $F_O$ represents the filtered digital output signal at the end of the previous operating cycle of the microprocessor and $F_N$ represents the filtered digital output signal at the end of the present operating cycle.

As will be described in more detail below, the filtering method of the present invention uses $F_O$, N and O in each operating cycle of the microprocessor to provide:

a. stability by damping small fluctuations in $F_N$;

b. rejection of noise spikes present in the digital signal from converter 16 at the input to the microprocessor; and c. a faster response at the output of the microprocessor to a step change in pressure than is provided by conventional filtering methods.

As will be appreciated from the description below, N for the present operating cycle will be the O that is used in the next operating cycle and $F_N$ at the end of the present operating cycle will be the $F_O$ that is used in the next operating cycle. As will be described in more detail below, the filtering method will determine if N or O or the average of N and O should be used as the measurement of pressure, $M_P$, during the present operating cycle and if $F_N$ at the end of the present operating cycle is to be either a new value or $F_O$ from the previous operating cycle.

The filtering method of the present invention provides stability by adjusting "A" in the well known equation:

$$F_N = A*M_P + (1-A)*F_O \tag{1}$$

where A is a constant between zero and 0 and may, for example, be 0.5, and $M_P$ is the measurement of pressure which may be either N or O as determined in the manner described hereinafter by the filtering method.

The filtering method provides rejection of noise spikes by measuring the pressure readings O and N against $F_O$. If the values of both O and N are either greater than or less than $F_O$, then the reading that is closer to $F_O$ is accepted as the correct measurement of the pressure sensed by cell 12 and the larger reading is discarded. However, if one of the two readings, O and N, is larger than $F_O$ and the other is smaller than $F_O$, the filtering method assumes that either O or N is a noise spike and not a true measurement. The filtered output $F_N$ for the present operating cycle remains at $F_O$ and the filtering method waits for the next operating cycle to repeat its analysis.

The filtering method provides a faster response at the output of the microprocessor to a step change in pressure than is provided by conventional filtering methods by determining if in the present operating cycle the difference between $F_O$ and N is either greater than or less than a predetermined count. If the difference in the previous operating cycle was also greater than or less than the predetermined count with the same sign as the difference in the present operating cycle, the method takes the average of N and O as the true measurement of pressure during the present cycle.

Figure 2A:
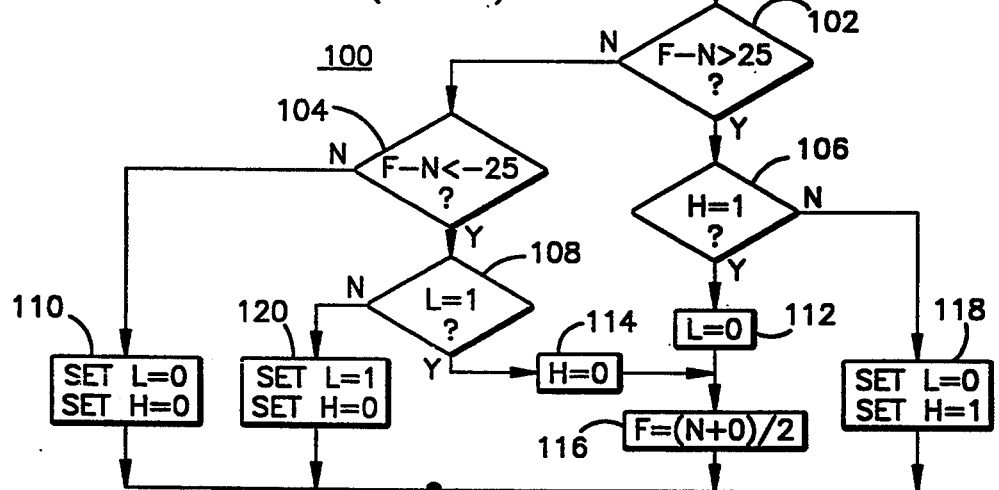
FIGS. 2a and 2b show a flow diagram for a set of instructions contained in the read only memory of the microprocessor of FIG. 1 which implement the method of the present invention.
Figure 2B:
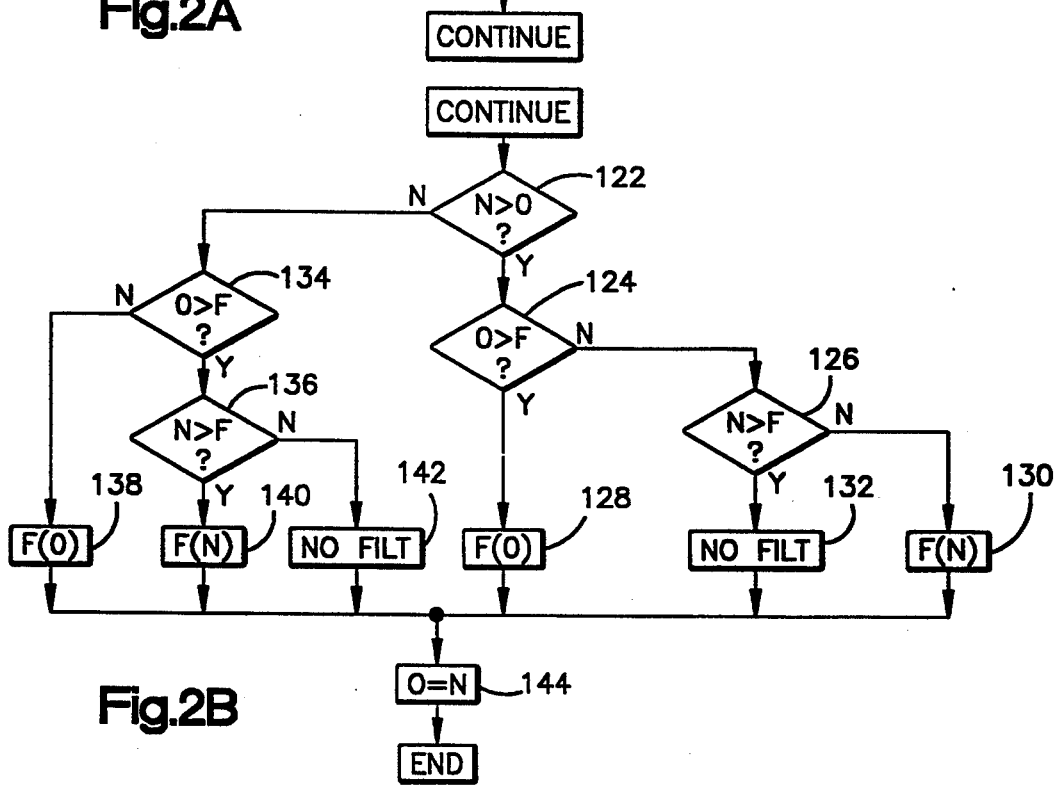

Referring now to FIGS. 2a and 2b, there is shown a flow diagram 100 of a set of instructions contained in the read only memory of microprocessor 18 that implement the filtering method of the present invention. Steps 102, 104, 106, 108, 112, 114 and 116, shown in FIG. 2a, implement that part of the method which provides the faster response at the output of the microprocessor to a step change in pressure. As will be described in more detail below:

a. steps 102 and 104 are used to determine if in the present operating cycle the difference between $F_O$ and N is either greater than or less than a predetermined number of counts;

b. steps 106 and 108 are used to determine if the difference in the previous operating cycle was also greater than or less than the predetermined number of counts with the same sign as the difference in the present operating cycle; and c. steps 112, 114 and 116 are used in setting the filtered output during the present operating cycle to be the average of N and O if the difference in both cycles is greater than or less than the predetermined number of counts with the same sign. The filtered output calculated by step 116 is halfway between N and O and replaces $F_O$ and appears unchanged at the output of the microprocessor since the method of the present invention does not, as will be described below in connection with FIG. 2b, change the filtered output of the microprocessor if the filtered output used in the method is between N and O.

Step 102 determines if the difference between $F_O$ and N is greater than a predetermined positive window threshold, which, may for example, be plus 25 counts. If that is not the case, then step 104 determines if the difference between $F_O$ and N is less than a predetermined negative window threshold, which may for example, be minus 25 counts, that is step 104 determines if $F_O$ is less than N by 25 counts. If step 102 determines that $F_O - N$ is greater than plus 25 counts, step 106 determines if a flag, designated as H, is a one. H will be a one in the present operating cycle if in the previous operating cycle $F_O$ was greater than N by plus 25 counts. If step 104 determines that $F_O - N$ is less than minus 25 counts, step 108 determines if a flag, designated as L, is a one. L will be a one in the present operating cycle if in the previous operating cycle $F_O$ was less than N by plus 25 counts.

If step 106 determines that H=1, step 112 sets L=0 in the present operating cycle. If step 108 determines that L=1, step 114 sets H=0 in the present operating cycle. In either case, the method reaches step 116 wherein it computes the average of N and O which replaces $F_O$ and becomes the filtered output at the end of the present cycle.

If the method reaches step 104 and determines therein that $F_O$ is not less than N by 25 counts, the method proceeds next to step 110 wherein it sets both L and H equal to zero. If the method reaches step 106 and determines that H is not equal to one, the method proceeds next to step 118 wherein it sets H=1 and L=0. If the method reaches step 108 and determines that L is not equal to one, the method proceeds next to step 120 wherein its sets L=1 and H=0.

Steps 122 to 142 shown in FIG. 2b, implement that part of the method which provides the rejection of noise spikes in the digital signal from converter 16 at the input to microprocessor 18 and determines if either N or O is to be used in equation (1) or if there is to be no change in the output of the microprocessor during the present operating cycle, that is, $F_N$ is equal to $F_O$, as follows:

a. Steps 122 and 124 determine if N and O are both greater than $F_O$ and N is greater than O in which case, step 128 uses O as the pressure measurement, $M_P$, in equation (1) to calculate $F_N$.

b. Steps 122, 124 and 126 determine if:
  (i) N and O are both less than $F_O$ and O is less than N in which case, step 130 uses N as the pressure measurement, $M_P$, in equation (1) to calculate $F_N$; or
  (ii) N is greater than $F_O$ and O is less than $F_O$, in which case step 132 does not change the output of the microprocessor during the present operating cycle, that is, there isn't any filtering during the present cycle.

c. Steps 122 and 134 determine if N and O are both less than $F_O$ and N is less than O in which case, step 138 uses O as the pressure measurement, $M_P$, in equation (1) to calculate $F_N$.

d. Steps 122, 134 and 136 determine if either:
  (i) N and O are both greater than $F_O$ and O is greater than N in which case, step 140 uses N as the pressure measurement, $M_P$, in equation (1) to calculate $F_N$; or
  (ii) N is less than $F_O$ and O is greater than $F_O$, in which case step 132 does not change the output of the microprocessor during the present operating cycle, that is, there isn't any filtering during the present cycle.

After either calculating $F_N$ using equation (1) or not changing the output of the microprocessor during the present operating cycle, the method proceeds to step 144 wherein O for the next operating cycle is set equal to N for the present operating cycle.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A method for use in an instrument that measures a parameter of a process, said instrument having a computing device therein, said computing device having a repetitive operating cycle, said method comprising the steps of:
   a) using a means to sense said process parameter, said means developing an analog signal representative of said sensed process parameter;
   b) sampling during each of said computing device operating cycles said analog signal representative of said sensed process parameter;
   c) converting said sampled analog signal representative of said sensed process parameter to a digital signal;
   d) filtering in said computing device during each of said repetitive operating cycles said digital signal representative of said analog signal representative of said sensed process parameter sampled during each of said operating cycles, said filtering providing a filtered digital output signal from said computing device representative of said sensed process parameter at the end of each of said operating cycles,
   said filtering comprising the steps of:
   i. determining if said digital signal, N, representative of said sensed process parameter sampled during the presently occurring one of said repetitive operating cycles and said digital signal, O, representative of said sensed process parameter sampled during said repetitive operating cycle occurring just previous to said presently occurring operating cycle are both greater or less than said filtered digital output signal, $F_O$, at the end of said previously occurring operating cycle;
   ii. determining, if both N and O are greater than $F_O$, if N is greater than O or if O is greater than N or, if both N and O are less than $F_O$, if N is less than O or if O is less than N; and
   iii. calculating said filtered digital output signal at the end of said presently occurring operating cycle, $F_N$, as a function of $F_O$ and either:
   1) O when N is greater than O and O is greater than $F_O$ or N when O is greater than N and N is greater than $F_O$; or
   2) O when N is less than O and O is less than $F_O$ or N when O is less than N and N is less than $F_O$.

2. The method of claim 1 further comprising the steps of determining in said presently occurring operating cycle if N is either greater than or less than $F_O$ and O is either less than or greater than $F_O$ and setting $F_N$ equal to $F_O$ when N is either greater than or less than $F_O$ and O is either less than or greater than $F_O$.

3. The method of claim 1 further comprising before the filtering steps set forth in claim 1, the steps of:

i) determining in said presently occurring operating cycle if the difference between $F_O$ and N is greater than or less than a predetermined number of counts;
   ii) determining if the difference between said filtered digital output signal at the end of said operating cycle just prior to said previously occurring operating cycle and said digital signal representative of said sensed process parameter sampled in said previously occurring operating cycle was also greater than or less than said predetermined number of counts with the same sign as said difference in said presently occurring operating cycle; and
   iii) setting $F_O$ during said presently occurring operating cycle equal to the average of N and 0 if said difference in said previously occurring operating cycle and said difference in said presently occurring operating cycle are both greater than or less than said predetermined number of counts with said same sign.

4. The method of claim 3 further comprising the steps of determining in said presently occurring operating cycle if N is either greater than or less than $F_O$ and O is either less than or greater than $F_O$ and setting $F_N$ equal to $F_O$ when N is either greater than or less than $F_O$ and O is either less than or greater than $F_O$.

5. The method of claim 1 wherein said step of calculating said filtered output signal at the end of said presently occurring cycle performs said calculation in accordance with:

$$F_N = A^* M_P + (1-A)^* F_O$$

where A is a constant and $M_P$ is either:
   i) O when N is greater than O and O is greater than $F_O$ or N when O is greater than N and N is greater than $F_O$; or
   ii) O when N is less than O and O is less than $F_O$ or N when O is less than N and N is less than $F_O$.

6. The instrument of claim 1 wherein said process parameter is differential pressure and said sensing means is a pressure cell.

7. A method for use in an instrument that measures a parameter of a process, said instrument having a computing device therein, said computing device having a repetitive operating cycle, said method comprising the steps of:
   a) using a means to sense said process parameter, said means developing an analog signal representative of said sensed process parameter;
   b) sampling during each of said computing device operating cycles said analog signal representative of said sensed process parameter;
   c) converting said sampled analog signal representative of said sensed process parameter to a digital signal;
   d) filtering in said computing device during each of said repetitive operating cycles said digital signal representative of said analog signal sampled during each of said operating cycles, said filtering providing a filtered digital output signal from said computing device representative of said sensed process parameter at the end of each of said operating cycles,
   said filtering comprising the steps of:
   i. determining in the presently occurring one of said repetitive operating cycles if the difference between said filtered digital output signal, $F_O$, at the end of said repetitive operating cycle occurring just previous to said presently occurring operating cycle and said digital signal, N, representative of said sensed process parameter sampled during said presently occurring operating cycle is greater than or less than a predetermined number of counts;

ii. determining if the difference between said filtered digital output signal at the end of said operating cycle just prior to said previously occurring operating cycle and said digital signal representative of said sensed process parameter sampled in said previously occurring operating cycle was also greater than or less than said predetermined number of counts with the same sign as said difference in said presently occurring operating cycle;

iii. setting $F_O$ during said presently occurring operating cycle equal to the average of N and said digital signal, O, representative of said sensed process parameter sampled during said operating cycle occurring just previous to said present operating cycle if said difference in said previously occurring operating cycle and said difference in said presently occurring operating cycle are both greater than or less than said predetermined number of counts with said same sign;

iv. determining if N and O are both greater or less than $F_O$;

v. determining, if both N and O are greater than $F_O$, if N is greater than O or if O is greater than N or, if both N and O are less than $F_O$, if N is less than O or if O is less than N; and vi. calculating said filtered digital output signal at the end of said presently occurring operating cycle, $F_N$, as a function of $F_O$ and either:
    1) O when N is greater than O and O is greater than $F_O$ or N when O is greater than N and N is greater than $F_O$; or
    2) O when N is less than O and O is less than $F_O$ or N when O is less than N and N is less than $F_O$.

8. The method of claim 7 wherein said step of calculating said filtered output signal at the end of said presently occurring cycle performs said calculation in accordance with:

$$F_N = A*M_P + (1-A)*F_O$$

where A is a constant and M, is either:
  i) O when N is greater than O and O is greater than $F_O$ or N when O is greater than N and N is greater than $F_O$; or
  ii) O when N is less than O and O is less than $F_O$ or N when O is less than N and N is less than $F_O$.

9. The method of claim 7 further comprising the steps of determining in said presently occurring operating cycle if N is either greater than or less than $F_O$ and O is either less than or greater than $F_O$ and setting $F_N$ equal to $F_O$ when N is either greater than or less than $F_O$ and O is either less than or greater than $F_O$.

10. The instrument of claim 6 wherein said process parameter is differential pressure and said sensing means is a pressure cell.

11. A method for use in an instrument that senses a parameter of a process, said instrument having a computing device therein, said computing device having a repetitive operating cycle, said method comprising the steps of:
  a) using a means to sense said process parameter, said means developing an analog signal representative of said sensed process parameter;
  b) sampling during each of said computing device operating cycles said analog signal representative of said sensed process parameter;
  c) converting said sampled analog signal representative of said sensed process parameter to a digital signal;
  d) filtering in said computing device during each of said repetitive operating cycles said digital signal representative of said sampled analog signal, said filtering providing a filtered digital output signal from said computing device representative of said sensed process parameter at the end of each of said operating cycles, said filtering comprising the steps of:
  i. comparing the amplitude of said digital signal, N, representative of said analog signal representative of said sensed process parameter sampled during the presently occurring one of said repetitive operating cycles to the amplitude of said filtered digital output signal, $F_O$, at the end of the repetitive operating cycle occurring just previous to said presently occurring operating cycle to determine if said amplitude of N is greater than or less than said amplitude of $F_O$;

ii. generating a first indication signal when said amplitude of N is greater than said amplitude of $F_O$ and a second indication signal when said amplitude of N is less than said amplitude of $F_O$;

iii. comparing the amplitude of said digital signal, O, representative of said sampled analog signal sampled during said previously occurring operating cycle to the amplitude of said filtered digital output signal, $F_O$, at the end of said previously occurring operating cycle to determine if said amplitude of O is greater than or less than said amplitude of $F_O$;

iv. generating a first indication signal when said amplitude of O is greater than said amplitude of $F_O$ and a second indication signal when said amplitude of O is less than said amplitude of $F_O$;

v. comparing when said first indication signal is generated for both N and O said amplitude of N to said amplitude of O to determine which of said amplitudes is greater;

vi. generating a N is greater amplitude indication signal when said amplitude of N is greater than said amplitude of O and an O is greater amplitude indication signal when said amplitude of O is greater than said amplitude of N;

vii. comparing when said second indication signal is generated for both N and O said amplitude of N to said amplitude of O to determine which of said amplitudes is lesser;

viii. generating a N is lesser amplitude indication signal when said amplitude of N is lesser than said amplitude of O and an O is lesser amplitude indication signal when said amplitude of O is lesser than said amplitude of N; and ix. generating said filtered digital output signal, $F_N$, at the end of said presently occurring operating cycle with an amplitude that is a function of $F_O$ and either:

1) O when said N is greater amplitude indication signal is generated and said first indication signal is generated for O or N when said O is greater amplitude indication signal is generated and said first indication signal is generated for N; or
2) O when said N is lesser amplitude indication signal is generated and said second indication signal is generated for O or N when said O is lesser amplitude indication signal is generated and said second indication signal is generated for N; and e) converting said filtered digital output signal to a filtered analog signal representative of said sensed process parameter.

12. The instrument of claim 11 wherein said process parameter is differential pressure and said sensing means is a pressure cell.

* * * * *